US006542611B1

(12) United States Patent
Lane et al.

(10) Patent No.: US 6,542,611 B1
(45) Date of Patent: Apr. 1, 2003

(54) MULTI-STATE ECHO SUPPRESSOR

(75) Inventors: Eric B. Lane, Beaverton, OR (US);
Forrest Seitz, Beaverton, OR (US);
Stan Sasaki, Lake Oswego, OR (US)

(73) Assignee: Circuit Research Labs, Inc., San Leandro, CA (US)

( * ) Notice: Subject to any disclaimer, the term of this patent is extended or adjusted under 35 U.S.C. 154(b) by 0 days.

(21) Appl. No.: 09/127,428

(22) Filed: Jul. 31, 1998

(51) Int. Cl.$^7$ .................................................. H04B 3/20
(52) U.S. Cl. ............................................ 381/66; 381/83
(58) Field of Search ........................... 381/66, 95, 96, 381/83; 379/406.01–406.16

(56) References Cited

U.S. PATENT DOCUMENTS

| | | |
|---|---|---|
| 4,039,753 A | 8/1977 | Balogh et al. |
| 4,069,395 A | 1/1978 | Nash |
| 4,275,398 A | 6/1981 | Parker et al. |
| 4,636,586 A | 1/1987 | Schiff |
| 4,696,015 A | 9/1987 | Palicot et al. |
| 5,305,307 A | 4/1994 | Chu |
| 5,323,459 A | 6/1994 | Hirano |
| 5,353,348 A | 10/1994 | Sendyk et al. |
| 5,454,041 A | 9/1995 | Davis |
| 5,542,000 A | 7/1996 | Semba |
| 5,559,793 A | 9/1996 | Maitra et al. |
| 5,619,582 A | 4/1997 | Oltman et al. |
| 5,646,990 A | 7/1997 | Li |
| 6,215,880 B1 * | 4/2001 | Hasegawa .................... 381/66 |

FOREIGN PATENT DOCUMENTS

GB 2269968 B 3/1996

OTHER PUBLICATIONS

"Echo Cancellation," chapter 4, p. 1–8 (1990).

* cited by examiner

*Primary Examiner*—Ping Lee
(74) *Attorney, Agent, or Firm*—Klarquist Sparkman, LLP

(57) ABSTRACT

An echo suppressor uses a multi-state operating sequence to provide non-disruptive monitoring of a remotely broadcast program during a performer's live performance at a local site. The operating sequence is actuated by a voice activated switch that initiates signal processing for correlating a locally originating audio (e.g., the performer's voice) to its echo in the broadcast program. During correlation states in the operating sequence, the echo suppressor switches monitoring to a local microphone signal to allow the performer to hear his or her own voice while preventing echo from being heard before correlation is achieved and echo suppression can begin. The correlation states include an initial correlation at a reduced sampling rate to detect echo within a wide delay time window and determine the locally originating audio is on-the-air. A subsequent state then performs a second correlation at a higher sampling rate to correlate to the echo in a narrower delay time window displaced according to the approximate delay determined in the initial correlation.

15 Claims, 6 Drawing Sheets

MULTI-STATE ECHO SUPPRESSOR

FIELD OF THE INVENTION

The present invention relates to suppressing (or removing) delayed audio feedback effects (also known as echo) from a live broadcast or other transmission.

BACKGROUND AND SUMMARY OF THE INVENTION

In many commonly occurring live broadcast scenarios, one or more audio signals originate from sources that are located geographically distant from a broadcast studio, and combined with audio from other distant or in-studio sources to form the broadcast program. For example, television news programs often include segments where a field reporter provides live coverage from the local scene of a newsworthy event. Sometimes, the field reporter's commentary is interrupted or interspersed with questions from an in-studio anchor. As another example, many television and radio talk shows feature live debates between a host and various experts who are electronically conferenced from multiple separate and geographically remote studios. The term "broadcast" as used herein refers to both through-air or wireless transmissions and to transmissions distributed over cable and other on-wire communication networks.

In these scenarios, it is desirable and even necessary that the local "performer" monitors the actual program being broadcast from the remote studio to receive his or her "cue" to begin speaking, and to hear other parties speak during the program. However, a time delay is introduced as the audio signal of the performer's voice is transmitted to the remote studio (e.g., on a land line, radio, microwave or satellite path) for mixing into the broadcast program, and a further time delay until the broadcast program transmission arrives back at the performer's site. This time delay is due to the time for the signal to travel along the communications path, as well as delays introduced by various electronics equipment in the path (more particularly, frame synchronizers, digital compressors, and other equipment). This delay produces an echo effect that can be very disconcerting and disruptive to performers (i.e., similar to the effect experienced by a singer in a large stadium), such that the performers may find it difficult (if not impossible) to speak while monitoring the broadcast program and are forced to remove or shut off their earphone to continue their live performance.

Echo also is a problem in other applications, such as distance learning and telephone conferencing. In some distance learning applications for example, students may attend a lecture transmitted to multiple locales. Often, the audio of the lecture is a mixture of not only the lecturer's microphone, but also of microphones at each of the locales. This allows the students at each locale to freely pose questions, and also hear questions posed by the students at the other locales. When the various microphone inputs are mixed at a central location (e.g., typically the lecturer's site), the students will hear a delayed echo of their own voice in the lecture's audio while posing their questions due to the transmission and other equipment delays. Telephone conferencing among multiple locations experiences a similar echo problem.

One prior solution to the echo problem in live broadcasts is to transmit a "mix-minus" signal from the remote studio to each local site for monitoring by the performer. At the studio, the audio signal of the performer's voice is mixed in with other audio inputs from other sources to form the broadcast program. An inverse of the performer's audio signal also is mixed with the broadcast program at the studio to form the mix-minus signal, which effectively cancels the performer's voice so that the mix-minus signal contains only the contributions of all the other audio inputs except that of the performer. The performer can then monitor the mix-minus signal without experiencing disconcerting echo effects. An example of a broadcast system using such mix-minus signals is disclosed in Davis, "Mix-Minus Monitor System," U.S. Pat. No. 5,454,041 (1995).

A drawback to the mix-minus approach is that an additional separate transmission path for each local performer is needed to transmit their respective mix-minus signal from the studio to their respective local site. The added communications links to the local sites can add significantly to the costs of producing the live broadcast program. Further, the additional signals and communications links to the local sites add considerable complexity to setting up and running production of a live broadcast program, and can increase the chance for technical errors during the program's production.

Various echo suppression techniques also are known and commonly used in telephone communications, particularly with conference or speaker telephones. In a typical telephone conversation, it is expected that the audio content in each direction is different. Also, it is expected that if any transmit-to-receive leakage (i.e., the "echo") exists, then the level of the echo will be substantially less than the level of the original audio (typically about 15 dB of attenuation) and has a minimal delay (less than 250 milliseconds). Echo suppression devices that have been used for such telephones generally have relied on these two conditions being present. These conditions, however, do not hold true in the above-described live broadcast, distance learning and conferencing situations. Specifically, the level of the performer's voice in the broadcast program typically is equal to or even greater than that from the performer's microphone, and the delay often is greater than 250 milliseconds (due, for example, to the use of frame synchronizers and digital compression). The signal sent from the performer's site to the remote studio and the program broadcast from the studio often have similar content, particularly when the performer is speaking.

A further drawback to typical echo suppression techniques is the speed at which the local microphone input can be correlated to echo in the return audio signal, particularly when the delay is unknown over a longer time interval (e.g., greater than 250 milliseconds).

The present invention provides the capability to suppress or remove echo of a local source audio signal from a remote return audio signal received at the local site, such as in the above-described live broadcast, distance learning and conferencing scenarios. The source audio signal and the return audio signal are digitally processed (e.g., in a digital signal processor running a correlation routine) to detect a time delay and level difference of any echo of the source audio signal contained in the return audio signal. An inverse of the source audio signal adjusted according to the time delay and level difference is then mixed with the return audio signal to suppress or cancel the echo from the return audio signal. The resulting echo-suppressed audio signal can then be mixed with the source audio signal (not delayed) and played on a monitoring device (e.g., a set of headphones or speakers) for comfortable listening, such as by a performer during a live broadcast.

According to one aspect of the invention, the echo suppression has a multiple state operating sequence that controls the audio signal sent to the monitoring device (e.g., headphones). The multiple state operating sequence accounts for a complex set of conditions, including that the source audio signal is not always "on the air" and that the correlation to detect time delay and level difference requires a finite amount of time to process. For example, a broadcast program audio signal may be sent to the monitoring device in an initial operating state when a live performer is "off the air." When the performer goes "on the air," the source audio signal without the return audio signal is played to the monitoring device during one or more states in which the correlation to the echo is sought. Then, the echo-suppressed audio signal is played to the monitoring device in states after the correlation to the echo is achieved. Finally, the echo suppressed audio signal also preferably is played for an interval approximately equal to the time delay after the source audio signal again goes off the air.

According to another aspect of the invention, the source audio signal is always sent to the monitoring device (i.e., the performer always hears the signal originating from their microphone) so as to avoid intervals where the performer is unable to hear his or her own voice. Depending on the operating state, two other signals may be added to the source audio signal at different times, which include the return audio signal and the echo suppressed audio signal (e.g., the broadcast program and the broadcast program with echo removed). Preferably, the volume of the added signal is ramped up when adding the signal during a state switch for smoother audio transitions.

According to a further aspect of the invention, a voice activated switch (VOX) or like measure of activity on the source audio signal initiates transitions between at least some of the operating states. For example, the VOX initiates a transition from an initial state where the return audio signal is sent to the monitoring device to one or more states where only the source audio signal is sent to the monitoring device and during which correlation to the audio signal takes place.

According to yet another aspect of the invention, the source audio signal is first correlated to the echo in the return audio signal at a reduced sample rate to define an approximate window (i.e., time interval) for a more exact correlation. This allows the amount of memory and processing needed for the correlation to be reduced, while allowing the correlation to be performed over a much larger time period.

In another aspect of the invention, values from a prior echo correlation are retained for use in a subsequent correlation so as to provide faster response in cases where the delay of the echo is likely to remain the same.

In yet another aspect of the invention, a correlation in a narrow window (based on echo delay from a prior correlation) is run simultaneously with a correlation at a reduced sample rate for a wider window. This allows the invention to detect echo over the wider window, while also providing the fast response in cases where the delay remains the same as the prior correlation.

The above features of the invention allow echo suppression in the specific conditions present in the above live broadcast, distance learning and conferencing scenarios. By defining a multiple state operating sequence under VOX control, the echo suppression according to these aspects of the invention prevents the performer from hearing echo while the correlation is being processed and as the source audio signal goes on and off the air. Further, the dual correlation (at both reduced and full sample rates) allows the echo suppression to be done more quickly for echo at longer time delays.

Additional features and advantages of the invention will be made apparent from the following detailed description of an illustrated embodiment, which proceeds with reference to the accompanying drawings.

DETAILED DESCRIPTION OF THE ILLUSTRATED EMBODIMENTS

Figure 1:
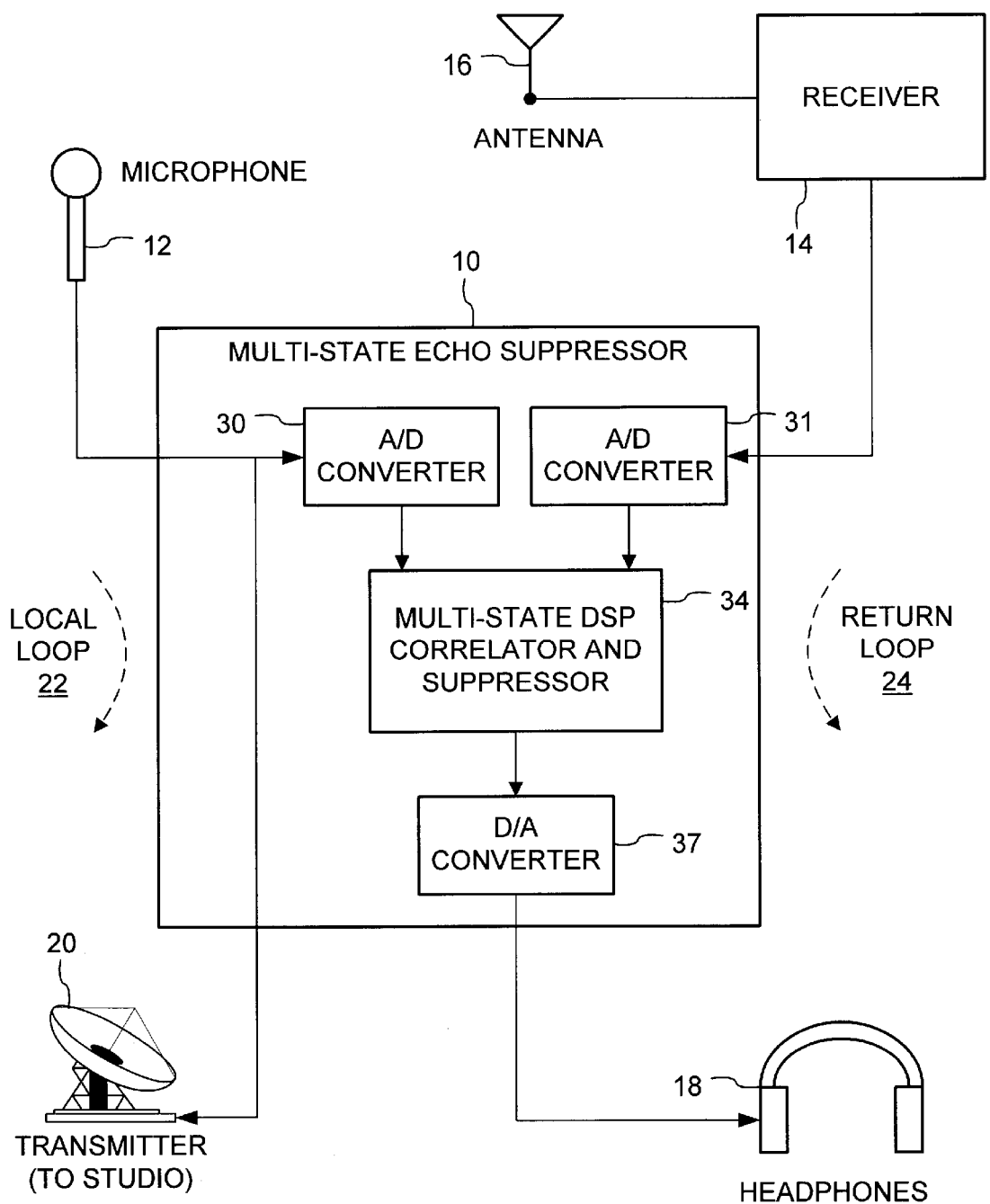
FIG. 1 is a block diagram of a multi-state echo suppressor according to an illustrated embodiment of the invention for use in a live broadcast geographically distant from a remote broadcast studio.

The present invention is directed toward multi-state echo suppression. In one embodiment illustrated herein, the invention is incorporated into an electronic device herein termed a multi-state echo suppressor 10. Briefly described, this product is used at a local site to suppress delayed echo of a local microphone audio signal on a return audio signal from a geographically remote location to allow non-disruptive listening to the return audio signal while speaking on the local microphone, such as by a live performer on a broadcast program, students of a distance learning program, or remote conferencing participants.

The multi-state echo suppressor 10 connects with four other pieces of equipment at the local site, including a local audio source, a return audio source, a monitoring device, and a transmitter. For connecting to this equipment, the multi-state echo suppressor includes standard cable connectors or ports, e.g., microphone and headphone jacks, RCA-type cable connectors, etc.

Typically, the local audio source is a microphone 12 or like sound-to-electrical signal transducer that produces an audio signal (the "local audio signal") from the performer's voice.

The return audio source can be a broadcast program receiver 14 (e.g., a radio or television receiver) and a from-air antenna 16, or like equipment (e.g., satellite dish) for receiving a remotely broadcast program, such as when the multi-state echo suppressor is used in a live broadcast scenario. The return audio source also can be via other communications media, such as telephone, computer network, cable, optic fiber, and others.

The program monitoring device (for convenience, referred to hereafter as the headphones 18) is a set of headphones, speakers or other electrical signal-to-sound transducer, which is used by the performer to listen to the return audio signal (e.g., the broadcast program in a live broadcast scenario).

The transmitter 20 is a transmitter used to transmit the local audio signal to a remote production studio, broadcast station, or other locales of a distance learning or conferencing application. The transmitter 20 can be microwave, radio, telephone, modem or other transmitter.

The multi-state echo suppressor 10 has two primary signal paths, a local loop 22 and a return loop 24. The local audio signal travels on the local loop 22 from the microphone 12 to the transmitter 20. The local audio signal passes through the local loop unchanged, except that some implementations of the multi-state echo suppressor 10 can provide compression or limiting as described more fully below. In some embodiments, the local loop 22 can be routed through the DSP 34 (described below) to provide such compression or limiting. The return loop 24 generally carries the return audio signal received on the from-air antenna 16 by the receiver 14 through the multi-state echo suppressor 10 to the headphones 18. In accordance with the invention, the return audio signal on its path through the return loop 24 has any echo of the local audio signal suppressed.

Within the multi-state echo suppressor 10, analog-to-digital converters 30–31 digitize the local audio signal and return audio signal at the inputs of the local loop 22 and return loop 24 into digital data streams. A digital signal processor (DSP) 34 having an echo correlator and suppressor (hereafter "DSP echo correlator and suppressor") resident therein processes the digital data stream from each loop 22, 24. The DSP echo correlator and suppressor uses a multi-state operation sequence described below to effect echo suppression in the signal monitored on the headphones 18 according to the invention. A digital-to-analog converter 37 converts the digital data stream at the output end of the return loop 24 back into analog audio.

The above-described circuitry in the multi-state echo suppressor 10 can be implemented as one or more integrated circuit chips supported on one or more printed circuit boards. Conventional, commercially available integrated circuits can be used for each of the converters 30–31, 37 and DSP 34. In general, the DSP 34 includes a microprocessor (preferably optimized for processing digital data streams, such as audio signals), non-volatile memory for storing operating code or instructions including the echo correlator and suppressor, and volatile memory to store data being processed. The circuitry is powered by an electrical power supply, which may be a battery (or batteries) and power supply circuit, an alternating current (A/C) converter, or other power supply. Further, the multi-state echo suppressor 10 is housed in an enclosure, which preferably is easily portable for use in mobile or in-field broadcasting scenarios. For example, the multi-state echo suppressor can be housed in an enclosure having a form factor that permits it to be worn or carried by the performer, such as strapped to the body or in a pocket. Alternatively, the multi-state echo suppressor 10 can be integrated with other equipment at the local site, such as a microphone headset, television camera, mobile transceivers, rack communications equipment, etc.

Echo Correlation and Suppression

Figure 2:
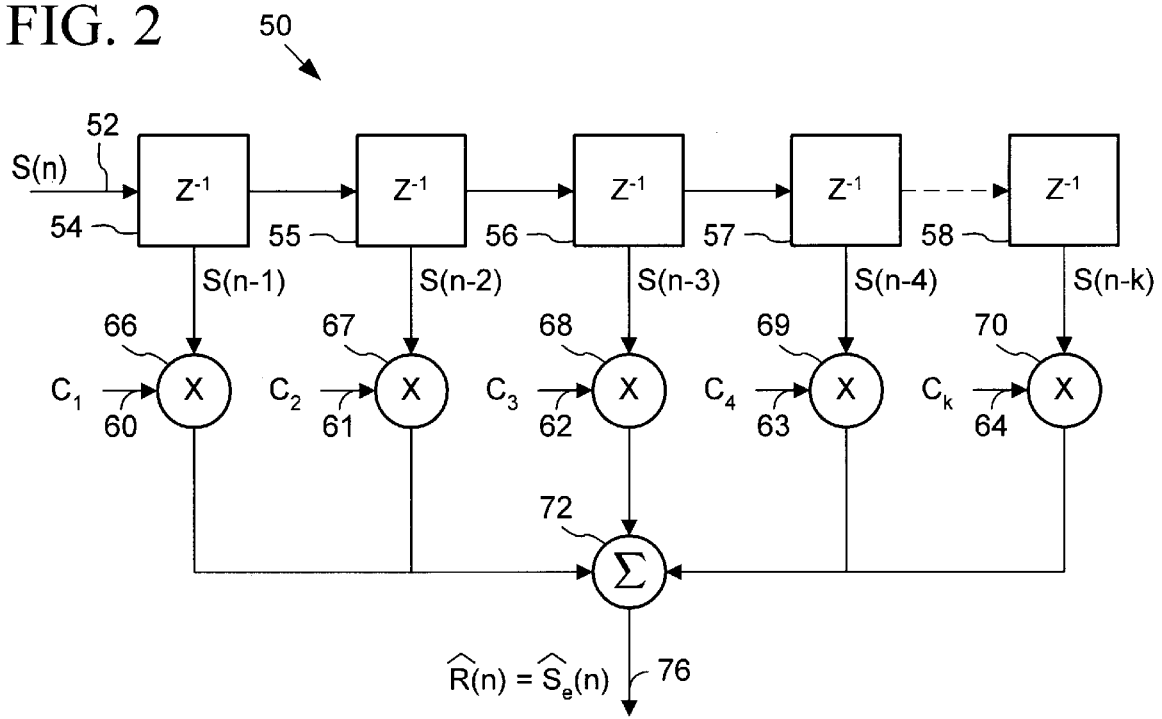
FIGS. 2 and 3 are block diagrams of an adaptive finite impulse response (FIR) filter used for echo correlation and suppression in the echo suppressor of FIG. 1.
Figure 3:
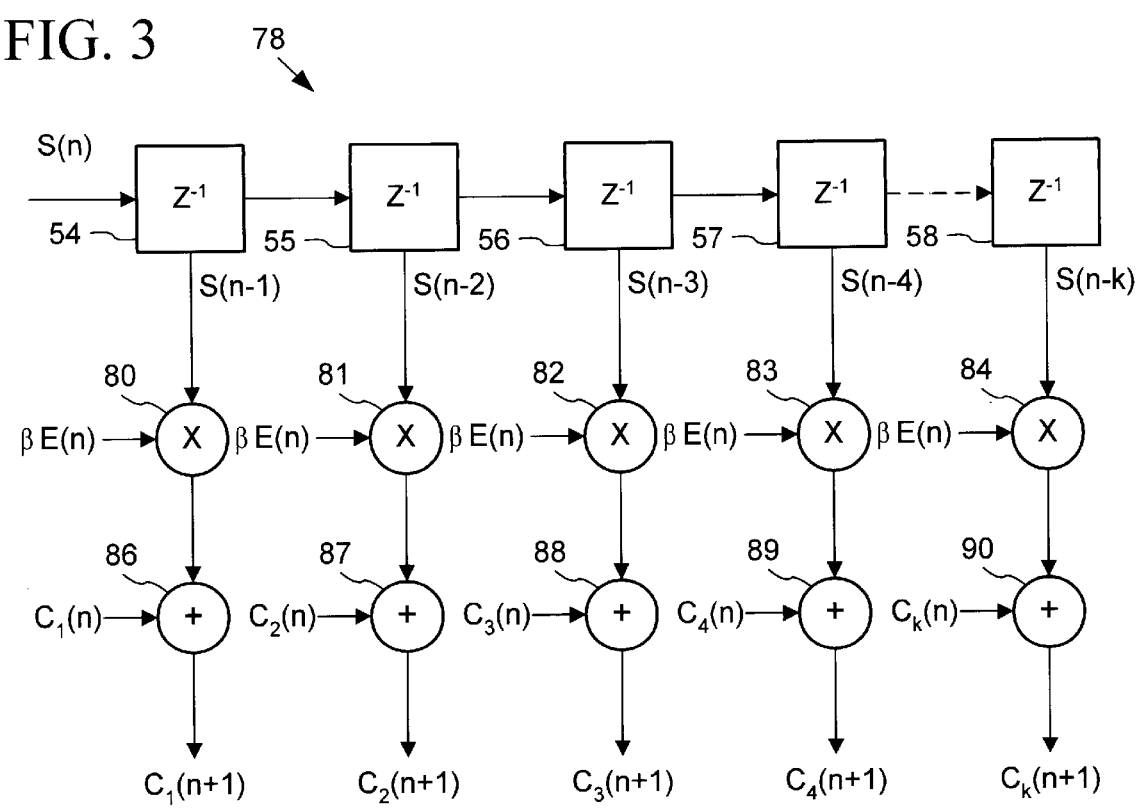
Figure 4:
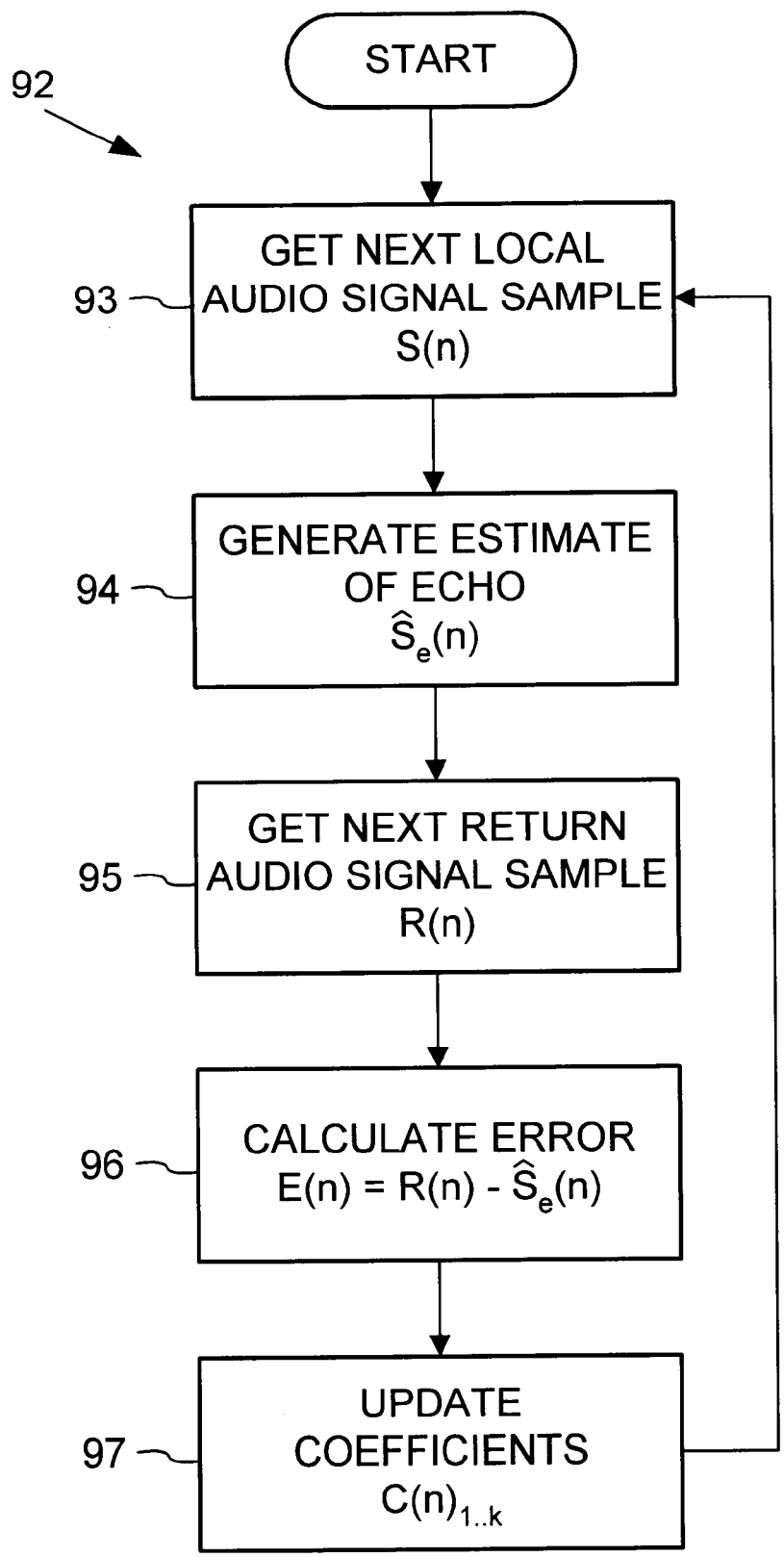
FIG. 4 is a flow diagram of an adaptation process for the FIR filter of FIGS. 2 and 3.

With reference to FIGS. 2–4, the DSP echo correlator and suppressor consists of various signal processing routines that identify a correlation (both delay time and level) of the local audio signal to its echo in the return audio signal, and cancel the echo from the received return audio signal. More particularly, the DSP echo correlator and suppressor routines implement an adaptive transverse finite impulse response (FIR) filter 50 (FIGS. 2 and 3) and a stochastic gradient (least mean squared or LMS) adaptation process 92 (FIG. 4) that effectively models the impulse response of the audio system as a whole (i.e., from local audio signal transmission to return audio signal reception). The multi-state echo suppressor 10 (FIG. 1) uses this FIR filter 50 to generate an estimate of the local audio signal's echo in the return audio signal, which the suppressor 10 then subtracts from the return audio signal to cancel the echo.

With reference to FIG. 2, the FIR filter 50 takes digitized samples of the local audio signal ("S(n)"), together with a set of adaptively modified coefficients ("$C(n)_1$, $C(n)_2$, ... $C(n)_k$") as its inputs. The FIR filter 50 shifts samples of the local audio signal through a set of stages 54–58, which effects a cumulative sample delay. At each sample time n, the FIR filter 50 shifts the current local audio signal sample at an input 52 into an initial stage 54 of the filter, and shifts previous samples to subsequent stages 55–58 of the filter. The stages thus produce a set of local audio signal samples at successive delays (i.e., s(n−1), s(n−2), s(n−3), ... ). The coefficients are input to the filter at a set of filter taps 60–64. The FIR filter 50 multiplies the samples at each stage 54–58 by respective coefficients at the filter taps 60–64 as represented at multiplication operations 66–70. Finally, the FIR filter 50 sums these products in an addition operation 72 to form a current sample of the estimated echo ("$\hat{S}_e(n)$") as the filter's output 76.

With reference to FIGS. 3 and 4, the coefficients of the FIR filter 50 (FIG. 2) are updated in a stochastic gradient LMS adaptation process 92 (FIG. 4) that adapts the FIR filter 50 to model the impulse response of the broadcast system. In an initial step 93, the process 92 acquires and inputs a next local audio signal sample S(n) for the current sample time into the FIR filter 50. The process 92 then uses the FIR filter 50 at step 94 to generate an estimate $\hat{S}_e(n)$ of the echo for the current sample time. At step 95, the process 92 acquires a next received return audio signal sample R(n) for the current sample time. The process 92 then calculates the difference or error E(n) between the received return audio signal sample R(n) and the echo estimate $\hat{S}_e(n)$ at step 96.

Finally, at a step 97, the process 92 updates the coefficients as shown in FIG. 3. In each of the FIR filter's stages 54–58, the delayed local audio signal sample S(n−1), S(n−2), ... S(n−k) at that stage is multiplied in multiplication operations 80–84 by the product of the error E(n) and an adaptation constant β (that determines the rate of convergence). The result is then added in addition operations 86–90 to the current value of the respective coefficients $C(n)_1$, $C(n)_2$, ... $C(n)_k$. This yields the values of the coefficients $C(n+1)_1$, $C(n+1)_2$, ... $C(n+1)_k$ to be applied to the filter taps in the subsequent sample time n+1.

In the illustrated multi-state echo suppressor 10 (FIG. 1), the adaptive FIR filter 50 uses a sample rate of approximately 9600 Hz and 960 as the number k of coefficients. With these parameters, the adaptive FIR filter can correlate and suppress echo within a delay time window of approximately 100 millisecond (ms) width. The adaptive FIR filter further uses an adaptation constant β in the range of 0.05 to 0.1. The processing in the DSP 34 required for the correlation to converge on the echo within this 100 ms window takes approximately two to three seconds. In other embodiments, theses parameters can be varied to achieve a desired tradeoff in processing demands (or cost) and performance. For example, the 9600 Hz sampling rate and 960 coefficients are considered to provide generally adequate echo suppression for voice communications, but a higher sampling rate and/or larger number of coefficients can be used where greater clarity is required.

Multi-State Operation

Figure 5:
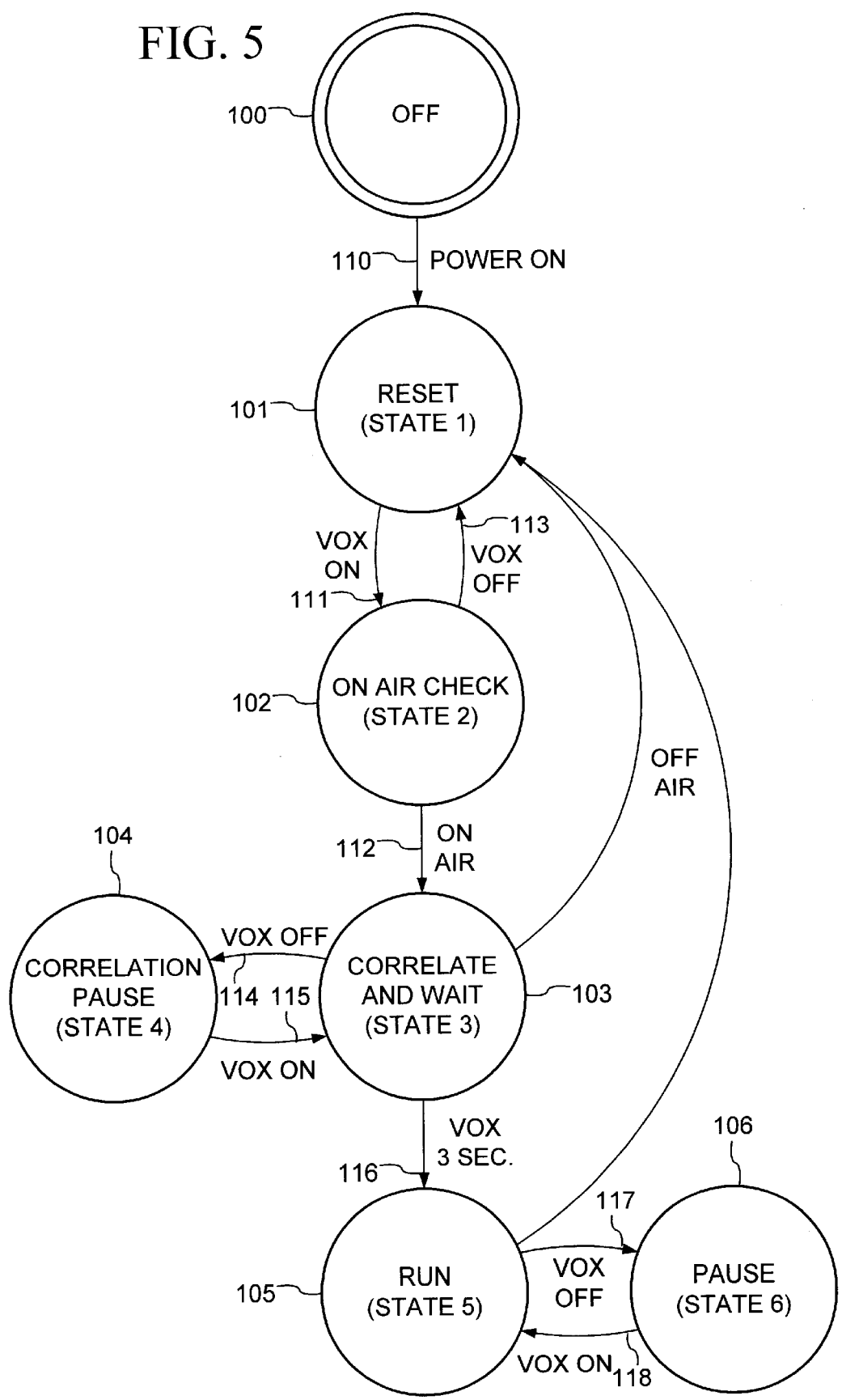
FIG. 5 is a state diagram of a multi-state operating sequence of the echo suppressor of FIG. 1.

With reference now to FIG. 5, the routines of the DSP echo correlator and suppressor (resident in DSP 34 of FIG. 1) are performed in a six state operation sequence with states 100–106. The states 100–106 control which of the DSP echo correlator and suppressor's correlation routines are run on the DSP 34 (FIG. 1), and determine the audio content of the signal that is output to the headphones 18 (FIG. 1) on the return loop 24. The six state operation sequence of the DSP echo correlator and suppressor allow for the fact that the local audio signal from the microphone 12 (FIG. 1) is not always "on-air" (i.e., contained in the return audio signal) and allows time to correlate to and suppress echo from the return audio signal.

At initial power on (indicated at 110), the DSP echo correlator and suppressor transitions from a "powered off" mode 100 to a reset state 101. The echo correlator and suppressor remains in the reset state 101 as long as no voice activity is detected on the local audio signal from the microphone 12 (FIG. 1). Since there is no microphone activity in the reset state 101, the DSP echo correlator and suppressor assumes that there is no echo in the return audio signal. Consequently, the DSP echo correlator and suppressor causes the return audio signal to be passed unchanged on the return loop 24 to the headphones 18 (FIG. 1).

When in the reset state 101, the DSP echo correlator and suppressor also resets the FIR filter coefficients $C(n)_1$, $C(n)_2$, ... $C(n)_k$ to zero, preparatory to performing echo correlation in later states (e.g., states 102 and 103 as described below). In some embodiments, the DSP correlator and suppressor alternatively can reset the coefficients to zero for only a first correlation to the echo in the return audio signal (e.g., after the initial power-on of the multi-state echo suppressor 10). For subsequent echo correlations (e.g., on the same broadcast program), the DSP echo correlator and suppressor can retain the coefficients resulting from a prior correlation to echo in the return audio signal, so as to provide faster convergence in the subsequent echo correlation.

The DSP echo correlator and suppressor uses a voice activated switch (VOX) to initiate a transition 111 to an on-air check state 102 where echo correlation begins (as well as to trigger transitions between other states as described below). The VOX in the illustrated multi-state echo suppressor 10 (FIG. 1) is implemented as a routine resident in the DSP 34, which detects activity (e.g., signal energy) in the local audio signal greater than a threshold level. This routine is run continuously (i.e., on each microphone sample) or at frequent intervals by the DSP echo correlator and suppressor. The VOX produces VOX-on and VOX-off conditions according to the detected activity of the local audio signal on a fast attack and slow release time basis.

When the VOX signals a VOX-on condition (such as due to detecting the performer's voice) while in the reset state 101, the DSP echo correlator and suppressor goes to the on-air check state 102. Since there is now activity on the local audio signal, an echo of the local audio signal may be present in the return audio signal if the performer is "on-the-air." The DSP echo correlator and suppressor prevents the performer from hearing such echo by causing the multi-state echo suppressor 10 to switch the output to the headphones 18 away from the return audio signal and over to the local audio signal alone. The performer thus hears the performer's own voice whenever the performer begins speaking. Also, if the performer happens to be "on-the-air," the performer is prevented from hearing an echo of their voice in the return audio before the multi-state echo suppressor is able to correlate to and begin suppressing the echo.

In an alternative embodiment of the invention, the multi-state echo suppressor 10 passes the return audio signal to the headphones at a reduced volume (e.g., attenuated by about −16 dB) while in the on-air check state 102 (and the correlate and wait state 103), so that audio cues to the performer in the return audio signal can still be perceived but echo is no longer distracting. In some such alternative embodiments, the level of attenuation is selectable by the user via a back panel switch (e.g., with attenuation settings of −6 dB, −10 dB, −16 dB, . . . , and infinite), which can be part of the controls 136 in FIG. 6 described below. At the infinite attenuation setting, the multi-state echo suppressor 10 completely switches off the return audio signal, and outputs only the local audio signal to the headphones 18 (FIG. 1).

In the on-air correlation check state 102, the DSP echo correlator and suppressor runs an on-air check routine to check whether any contribution from the local audio signal is present in the return audio signal (e.g., whether the performer is "on-the-air"). The on-air check routine uses the processing described above for the FIR filter 50 (FIG. 2) and adaptation process 92 (FIGS. 3 and 4) to correlate the local audio signal to echo in the return audio signal. For the on-air check, the DSP echo correlator and suppressor runs the FIR filter 50 at a reduced sampling rate (as compared to the sampling rate used during normal correlation for the echo suppression in the run state 105 described below). This allows the on-air check to correlate to the echo more quickly over a larger delay time window, but with reduced resolution.

The reduction in sample rate also allows a commensurate increase in filter length for a given DSP processing load. More particularly, the processing load (e.g., in MIPS) on the DSP is the limiting factor of the echo correlation and suppression process, and is generally proportionate to the product of the sample rate ($F_s$ in Hz) and the filter length (n). Accordingly, the filter length can be increased by the same factor by which the sample rate is reduced to yield approximately a same DSP processing load. The increased filter length also increases the size of the delay time window, which size equals the quotient ($n/F_s$). Thus, for a factor (m) times reduction in sample rate together with the same factor (m) increase in filter length, the window size is increased by ($m^2$) times. Preferably, to simplify computation, the factor is an integer. In the illustrated multi-state echo suppressor for example, the reduced sampling rate in the on-air check state is ⅓ of the full sampling rate during echo suppression (e.g., a reduced sampling rate of 3200 Hz for a full sampling rate of 9600 Hz), which allows a three times increase in the filter length at approximately the same DSP processing load. This allows an increase in delay time window size of about nine times (e.g., to 800 ms in the illustrated suppressor 10).

More particularly, when the FIR filter 50 is run during the on-air check, the adaptation process 92 modifies the coefficients $C(n)_1$, $C(n)_2$, . . . $C(n)_k$ to match the system's impulse response. The coefficients produced by this processing generally represent an impulse response wave form of the system (i.e., the system including the transmission path to the remote mixing site and return therefrom). When the performer is on-the-air, the impulse response wave form appears as a slightly widened impulse that is displaced in time by the delay from the local audio signal to its echo in the return audio signal. Accordingly, the on-air correlation check determines that the performer is on-the-air when the wave form represented by the coefficients has this shape. Where the local audio signal is detected to be on-the-air, the displacement of the impulse in the impulse response wave form also indicates a delay time of the local audio signal's echo in the return audio signal.

In other words, the FIR filter coefficients at the beginning of the on-air check are initially reset (e.g., in the reset state 101 as described above). The coefficients will generally remain at a zero, except for a coefficient at the filter stage (or group of coefficients at adjacent filter stages) corresponding to the echo's delay. Such coefficient is dynamically adjusted by the LMS adaptation process 92 (FIG. 3) to a value indicative of the magnitude of the echo relative to the local audio signal. The DSP correlator and suppressor determines that the impulse response has the displaced impulse shape (and thus the performer is on-the-air) if any coefficient has a value indicating a magnitude that is at least a substantial fraction of the local audio signal (e.g., at least ½ the magnitude of the local audio signal). In some embodiments, the DSP correlator and suppressor may additionally check that other coefficients are approximately zero (e.g., coefficients other than some tightly grouped or adjacent coefficients with values indicative of an echo magnitude at least a substantial fraction of the local audio signal).

In the illustrated multi-state echo suppressor, the FIR filter and adaptation processing performed in the state 102 for the on-air check is done at a reduced sample rate (as compared to the processing in the correlate and wait state 103 described below). This reduced sampling rate correlation allows the DSP echo correlator and suppressor to detect correlation between the local audio signal and the return audio signal over a much longer period of time (window) for a given consumption of memory and processing resources of the DSP, but results in a more approximate estimate of the echo's delay time (e.g., to within about a 100 millisecond window in the illustrated multi-state echo suppressor 10). Since each correlation takes approximately 2–3 seconds for the coefficients to converge sufficiently, the combination of the reduced sampling rate correlation with a second correlation at a higher sample rate (i.e., in state 103 described below) which correlates within the 100 millisecond window, the echo correlator and suppressor can more quickly determine the echo's delay time when it is unknown to within a large time period. Otherwise, each attempt to correlate the signals within each successive 100 millisecond window using the higher sample rate takes approximately two to three seconds to complete. So as to achieve savings with the combination of reduced and full sampling rate correlations over repeating full sampling rate correlations for successive adjacent windows, the full sampling rate should be at least twice the reduced sampling rate (which results in window for the reduced sampling rate correlation that is at least twice the size of the window in the full sampling rate correlation for an FIR filter having a given number of coefficients).

The echo correlator and suppressor remains in the on-air check state (continuing to run the on-air check) until the local audio signal is determined to be on-the-air, or until the VOX-off condition attains (e.g., when the performer stops speaking). From the on-air check state 102, the echo correlator and suppressor makes a transition 112 to a correlate and wait state 103 if the on-air correlation check determines that the local audio signal is on-the-air. If a VOX-off condition is instead signaled, then a transition 113 is made back to the reset state 101.

At the correlate and wait state 103, the echo correlator and suppressor in the DSP 34 (FIG. 1) performs a correlation check again using the adaptive FIR filter 50, but at the full sampling rate to more accurately determine the delay time and magnitude of the echo. This check correlates the local audio signal and return audio signal within a narrower window (e.g., about 100 ms in the illustrated multi-state echo suppressor) centered on the delay time determined by the reduced sampling rate correlation performed for the on-air check in the on-air check state 102. More specifically, the check centers the narrower window according to the delay time from the reduced sampling rate correlation by adding additional delay (hereafter "pre-filter delay") to the local audio signal samples before the first stage 54 (FIG. 2) of the FIR filter 50. The check then resets the coefficients to zero, and runs the adaptive FIR filter 50 and adaptation process 92.

As described above, the correlation using the adaptive FIR filter 50 at the full sampling rate takes approximately two to three seconds to converge in the illustrated multi-state echo suppressor 10. Until convergence, the adaptive FIR filter 50 is not able to suppress the echo in the return audio signal. The DSP echo correlator and suppressor continues to prevent the performer from hearing echo while speaking during the correlate and wait state 103, by causing the multi-state echo suppressor 10 to output the local audio signal to the headphones 18 (FIG. 1) and not the return audio signal (or alternatively attenuating the return audio signal output to the headphones).

If the VOX-off condition is signaled (e.g., the performer stops speaking) during the correlation in the correlate and wait state 103, the echo correlator and suppressor makes a transition 114 to a correlation pause state 104. In the correlation pause state 104, the echo correlator and suppressor cause the return audio signal to again be passed to the headphones 18. Preferably, the slow release time of the VOX or a slow volume ramp-up of the return audio signal prevents the performer from hearing a last echo of the performers voice when the return audio signal is again passed to the headphones 18 in this state after the performer ceases speaking. When the VOX-on condition is again signaled as indicated by a transition 115, the echo correlator and suppressor returns the correlate and wait state 103 where correlation to the echo is re-attempted. During the pause state 104, the DSP echo correlator and suppressor stops running the adaptive filter 50 and adaptation process 92, but can retain the coefficients produced to that point so as to allow the correlation to complete more quickly when resumed.

When a satisfactory correlation to the echo is achieved in the correlate and wait state 103 (typically after about two to three seconds of a continuous VOX-on condition while on-the-air in the illustrated echo suppressor 10), the echo correlator and suppressor makes a transition 116 to a run state 105. In the illustrated multi-state echo suppressor, the condition for satisfactory correlation in the correlation check of state 103 is similar to that for the on-air check in state 102. More particularly, the DSP echo correlator and suppressor determines that a satisfactory correlation has been obtained when a coefficient has reached a threshold value indicating an echo magnitude that is substantial fraction (e.g., one half) of the local audio signal.

In the run state 105, the DSP echo correlator and suppressor begins suppressing the echo in the return audio signal. The echo correlator and suppressor in the DSP 34 (FIG. 1) subtracts the echo estimate $\hat{S}_e(n)$ produced by the adaptive FIR filter 50 (FIG. 2) from the return audio signal data stream. This effectively cancels the echo, resulting in an echo suppressed return audio signal. The DSP echo correlator and suppressor causes the multi-state echo suppressor 10 to switch to outputting the echo suppressed return audio signal to the headphones 18 (FIG. 1).

While in the run state 105, the echo suppressor and correlator makes a transition 117 to and a transition 118 back from a pause state 106 in response to the VOX-off and VOX-on conditions, respectively. In the pause state 106, the echo suppressor and correlator retains the correlation coefficients determined in the correlate and wait states indefinitely on the assumption that the VOX-on condition will resume momentarily. The echo suppressor and correlator also ceases to suppress the echo, allowing the return audio signal to pass unchanged to the headphones 18. When returned to the run state 105, the DSP echo correlator and suppressor restarts the adaptive FIR filter 50 with the retained coefficients, which allows the multi-state echo suppressor 10 to immediately resume echo suppression (i.e., without waiting for a new correlation).

The echo suppressor and correlator goes back to the reset state 101 from the correlate and wait state 103 or run state 105 upon detecting that the local audio signal is no longer present in the return audio signal (i.e., the performer is "off-the-air"). In the illustrated multi-state echo suppressor 10 (FIG. 1), the determination that the local audio signal is off-the-air is made when the FIR filter coefficients all drop below a value indicative of an echo magnitude that is a preset fraction of the local audio signal (where the preset fraction is less than the substantial fraction used for the on-air and correlation checks).

Built-in Microphone Pre-Amplifier

Figure 6:
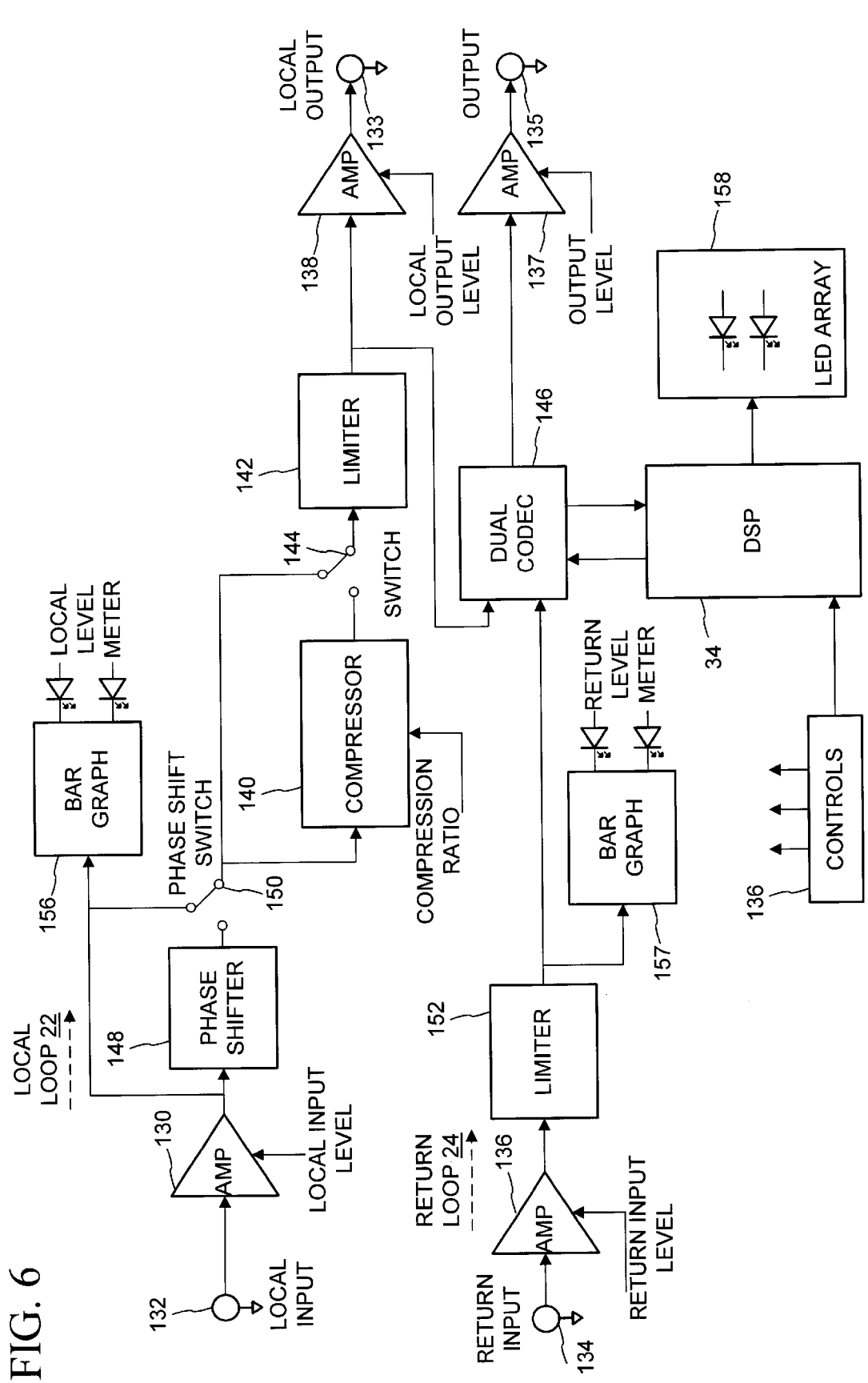
FIG. 6 is a more detailed block diagram of the multi-state echo suppressor of FIG. 1, that shows a phase shifter, compressor, and limiter in a local loop.

FIG. 6 shows the multi-state echo suppressor 10 (also shown in FIG. 1) in more detail. The illustrated multi-state echo suppressor 10 includes an amplifier 130 connected at a local input 132 in the local loop 22 (where the microphone 12 connects to the multi-state echo suppressor). The amplifier 130 acts as a built-in microphone pre-amplifier. The multi-state echo suppressor 10 has a set of controls 136, which include a switch to select between unity gain and pre-amplification. This switch sets a local input level signal that controls the amount of amplification of the amplifier 130. With the switch in the unity gain setting, the multi-state echo suppressor 10 provides unity gain in the local loop 22 and is useable for a mode of operation (the "mic-in/mic-out mode") which accepts a microphone input level signal (such as, at about −57 to −62 dBm) at the local input 132 and outputs a microphone output level signal at a local output 133 (i.e., the output to the transmitter 20). The unity gain setting also is applicable to a mode of operation (the "line-in/line-out mode") with a line-in level signal at both local input 132 and local output 133.

On the other hand, with the switch in the pre-amplification setting, the multi-state echo suppressor 10 provides a mode of operation (the "mic-in/line-out mode") which accepts a microphone input level signal at the local input 132, and amplifies the local audio signal in the pre-amplifier 130 to a line-out level signal at the local output 133. The pre-amplifier 130 has an adjustable output level that can be set based on an external reference. Phantom power (about 48 VDC and 1 mA) is selectable. The pre-amplifier 130 provides approximately 50 dB gain for a line-in level local audio signal on the local loop 22 from a microphone input level signal.

The multi-state echo suppressor 10 also has amplifiers 136–138 at each of the local output 133 (e.g., to headphones 18), return input 134, and output 135 (e.g., to transmitter 20). These amplifiers allow adjustment of the signal levels at these outputs and input, such as 0 dBm, 4 dBm, etc. The amplification is controlled by input level signals applied to the amplifiers that can be set by the user via the controls 136.

Audio Compressor, Limiter, and Phase Shifter

With reference still to FIG. 6, the performance of the multi-state echo suppressor 10 is optimized when the local audio signal scales linearly to its echo in the return audio signal. Any non-linear variations that are introduced into the local audio signal after the local loop 22 (i.e., between its output from the local output 133 and its echo in the return audio signal) will adversely affect the echo correlation and suppression. This results in anomalies or noise being added to the echo suppressed return audio signal that is output at the output 135 on the return loop 24. The non-linearities can result when the local audio signal is modified by compression and/or limiting (i.e., clipping the signal to a desired range) after the local loop 22, such as in transmission equipment or at the remote studio.

So that any desired compression and limiting of the local audio signal is performed before the echo correlation and suppression, the multi-state echo suppressor 10 preferably provides a built-in compressor 140 and a limiter 142. The compressor 140 and limiter 142 are located in the local loop 22 before a dual codec 146, which provides the analog-to-digital and digital-to-analog conversion shown at 30–31 and 37 in FIG. 1. The compression ratio of the compressor is controlled by a compression ratio value applied at an input of the compressor 140. A compression switch 144 can be set by the user to selectively shut-off the compressor 140, if compression is not desired. The limiter 142 clips the local audio signal to a suitable operating range for the audio system. The illustrated multi-state echo suppressor 10 also includes a limiter 152 in the return loop 24 for limiting the return audio signal to the input range of the dual codec 146.

The illustrated multi-state echo suppressor 10 also includes a phase shifter 148 in the local loop 22 to further improve echo correlation and suppression. Typically, a performer's voice produces an audio signal that is asymmetrical about the zero level axis. The phase shifter 148 is a phase chasing circuit that improves the symmetry of the audio signal about the axis prior to the echo correlation and suppression via the codec 146 and the DSP 34. The improved symmetry of the local audio signal results in the echo correlation and suppression process being better able to match and remove the echo in the return audio signal. The multi-state echo suppressor 10 includes a switch 150 for selectively activating or deactivating the phase shifter 148.

Voice Reinforcement

With reference still to FIG. 6, the illustrated multi-state echo suppressor enhances the perceived echo suppression using voice reinforcement. With the voice reinforcement, the local microphone audio signal (e.g., of the performer's voice) is enhanced relative to the echo suppressed return audio signal when output at the output 135 (FIG. 6) to the headphones 18 (FIG. 1). The voice reinforcement can be performed in the run state 105 (FIG. 5) when the local microphone audio signal is combined with the echo suppressed return audio signal at the output, or alternatively in all states in which the local microphone audio signal is output to the headphones 18.

Upon correlation, the DSP 34 determines the level of the echo in the return audio signal, and causes the codec 146 to scale the local audio signal by an appropriate multiplier relating to the ratio of this level to that of the local audio signal. Without voice reinforcement, the codec 146 simply scales the local audio signal to match the return audio signal's level. With voice reinforcement, the codec 146 scales the local audio signal to a slightly louder level than the return audio signal, such as about 9 dB above the return audio signal's level. The scaled local audio signal is then combined with the echo suppressed return audio signal for output to the headphones 18 (FIG. 1) at the output 135 (FIG. 6). This voice reinforcement serves to mask the suppressed echo in the output audio. In other words, the voice reinforcement creates the perception of greater echo suppression or attenuation.

In some embodiments of the invention, a switch is provided in the controls 136 (FIG. 6) to select between activation and deactivation of voice reinforcement. The controls 136 also can provide a slider, dial or like control to allow user adjustment of the amount of voice reinforcement, i.e., the amount of scaling of the local audio signal above the return audio signal's level when voice reinforcement is selected.

The illustrated multi-state echo suppressor 10 also includes bar graph generators 156–157 with LEDs that provide a local level meter and return level meter display, for visually monitoring the levels of the respective local and return audio signals. An LED array 158 (of 2×16 LEDs) indicates the status of various user settings (selected via the controls 136) and status of the multi-state echo suppressor.

Fast Response Echo Correlation

Referring again to the state diagram of FIG. 5, the multi-state echo suppressor 10 features a fast response echo correlation routine on the DSP 34, which is run in response to the VOX-ON transition 111 from the reset state 101 of the multi-state operating sequence. For use in the fast response echo correlation, the DSP 34 stores parameters of one or more known, prior full sample rate correlations. These parameters include the pre-filter delay, and the one or more FIR filter coefficients (e.g., by filter stage and value) that have values indicative of echo that is a substantial fraction of the local audio signal (i.e., the zero and near-zero value FIR filter coefficients typically represent noise in the return audio signal, and need not be stored). The prior full sample rate correlation can simply be the last (i.e., immediately preceding) full-rate correlation obtained by the multi-state echo suppressor 10. Alternatively, the multi-state echo suppressor 10 can store parameters of a plurality of prior full-rate correlations as "correlation presets" that are selectable by the user via radio buttons that are part of the controls 136 shown in FIG. 6 (similar to channel presets on an FM radio tuner). The parameters of the prior full-rate correlation is stored during the prior iteration through the multi-state operation sequence immediately upon the correlation being achieved (e.g., on transition to the run state 105).

In the fast response correlation routine (begun on the VOX-ON transition 111), the DSP 34 simultaneously runs two separate correlation operations. In a first of these simultaneous correlation operations, the DSP 34 runs the normal correlation checks of the on-air check state 102 and correlate-and-wait state 103, as described above for the Multi-State Operation. Specifically, a new reduced-rate correlation with a wide window (e.g., about 250 ms) is performed in the on-air check state 102, which is followed by a new full-rate correlation in the correlate-and-wait state 103 if the reduced-rate correlation results in the on-air condition 112. These new correlations are begun with all FIR filter coefficients reset to zero. The pre-filter delay for the full-rate correlation is based on the results of the reduced-rate correlation.

In the second simultaneous correlation operation, the DSP 34 runs a full-rate correlation of the correlate-and-wait state 103 alone, which is based on the stored parameters (e.g., of a user-selected correlation preset). The pre-filter delay of this full-rate correlation is set to that of the stored, prior full-rate correlation. The FIR filter coefficients also are initially set according to those of the stored, prior full-rate correlation. So that correlation is not immediately signaled before the adaptation process has the opportunity to detect actual echo in the return audio signal, the FIR filter coefficients can be appropriately scaled down from those of the prior full-rate correlation (i.e., scaled below the correlation threshold indicative of echo at a substantial fraction of the local audio signal). Also, the near-zero valued FIR filter coefficients (which typically correspond to noise in the return audio signal during the prior full-rate correlation) are initially reset to zero.

The adaptation process 92 of FIG. 4 is then run on each of the first and second correlation operations simultaneously, until one of the correlation operations produces the correlation condition 116 at the full sample rate. The successful correlation (with its pre-filter delay) is then used for echo suppression in the run state 105.

The fast response correlation routine typically provides a faster response where the delay of the echo is known or expected to remain constant, and additionally protects against a failure to correlate when the delay deviates outside the expected "window." The second correlation operation (based on the stored correlation preset) results in a fast response echo suppression where the delay remains consistent with the prior correlation. For example, compared to the normal operation where the delay is unknown (which can take the time of several spoken syllables), the second correlation can complete in the duration of part of a spoken syllable. The first correlation operation simultaneously provides a failsafe by checking for echo outside the second correlation operation's narrow window.

The illustrated multi-state echo suppressor 10 is equipped with a correlation mode select switch (part of the controls 136 of FIG. 6, such as a slide switch located on the housing of the echo suppressor 10), which allows selection between a normal correlation operation (as described in the description of the Multi-State Operation above) or the fast response echo correlation routine based on correlation presets.

In some alternative embodiments of the multi-state echo suppressor, the DSP 34 lacks a fast response correlation routine that simultaneously performs the first and second operations. The correlation mode select switch instead selects between a full correlation mode (with the normal correlation operation) for use when the delay is unknown, and a narrow search mode for use when the delay is known. The narrow search mode performs only the full-rate correlation of the second correlation operation described above (without the simultaneous "failsafe" first correlation operation).

Audio Console/Remote Return Input Switching

In some embodiments of the illustrated multi-state echo suppressor 10, the multi-state echo suppressor includes two inputs for the return loop 24. One of these inputs is for connecting a remote return signal (such as a broadcast program received from-air). The other input connects to an audio console at the local site for receiving a return of the local audio signal immediately prior to transmission, and after any local processing of the signal. The echo suppressor includes a switch for selecting which of the signals is connected in the return loop, so as to allow the user to select which of the two signals to monitor (without echo).

Having described and illustrated the principles of our invention with reference to an illustrated embodiment, it will be recognized that the illustrated embodiment can be modified in arrangement and detail without departing from such principles. For example, it should be understood that the programs, processes, or methods described herein are not related or limited to any particular type of signal processing apparatus, unless indicated otherwise. Various types of general purpose or specialized apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of suppressing echo of a locally originating audio signal from a return transmission audio signal, the method comprising the steps of:

detecting voice activity in the locally originating audio signal;

processing the locally originating audio signal and return transmission audio signal according to a multi-state operating sequence having at least one correlate state during which the processing correlates the locally originating audio signal to echo in the return transmission audio signal, and an echo suppress state in which the processing suppresses echo in the return transmission audio signal to produce an echo suppressed audio signal;

selectively switching among at least the locally originating audio signal and the echo suppressed audio signal for output to a monitoring device depending on a current state in the multi-state operating sequence;

causing a transition to a first of the at least one correlate state in response to the presence of voice activity in the locally originating audio signal being detected; and switching to output of the locally originating audio signal in the first of the at least one correlate state.

2. The method of claim 1 further comprising the step of: switching to output of the echo suppressed audio signal in the echo suppress state.

3. The method of claim 2 further comprising the step of: switching to output of a combination of the locally originating audio signal and the echo suppressed audio signal in the echo suppress state.

4. The method of claim 3 further comprising the step of: reinforcing the amplitude of the locally originating audio signal relative to said echo suppressed audio signal in said combination to thereby further mask said echo.

5. The method of claim 4 wherein the amplitude of the locally originating audio signal is reinforced according to a user-selectable setting.

6. The method of claim 3 further comprising the step of: matching the amplitude of the locally originating audio signal to that of said echo suppressed audio signal in said combination.

7. The method of claim 1 further comprising the step of: switching to output of the return transmission audio signal in an initial state prior to the at least one correlate state.

8. The method of claim 7 further comprising the step of: switching to output of a combination of the locally originating audio signal and the return transmission audio signal in the initial state.

9. The method of claim 1 wherein the step of selectively switching comprises the steps of:

continuously passing the locally originating audio signal for output to the monitoring device;

selectively adding the echo suppressed audio signal to the locally originating audio signal for output to the monitoring device depending on the current state in the sequence.

10. The method of claim 9 further comprising the step of: amplifying the added locally originating audio signal relative to said echo suppressed audio signal for said output to the monitoring device to thereby further mask said echo.

11. The method of claim 10 wherein the added locally originating audio signal is amplified by a user-adjustable gain ratio relative to the echo suppressed audio signal.

12. The method of claim 9 further comprising the steps of:

adding the return transmission audio signal to the locally originating audio signal in an initial state prior to the at least one correlate state for output to the monitoring device;

passing only the locally originating audio signal for output to the monitoring device in the at least one correlate state; and adding the echo suppressed audio signal to the locally originating audio signal for output to the monitoring device in the echo suppress state.

13. The method of claim 9 further comprising the steps of:

attenuating the return transmission audio signal; and adding the attenuated, return transmission audio signal to the locally originating audio signal for output to the monitoring device in the at least one correlate state.

14. The method of claim 1 further comprising the steps of:

in the first of the at least one correlate state, performing a reduced sampling rate correlation of the locally originating audio signal to the echo in the return transmission audio signal to determine whether the locally originating audio signal is on-the-air and to approximately determine delay of the echo from the locally originating audio signal within a wider window of time;

causing a transition to a second of the at least one correlate state in response to determining that the locally originating audio signal is on-the-air in the first of the at least one correlate state; and in the second of the at least one correlate state, performing a first full sampling rate correlation of said locally originating audio signal to said echo in said return transmission audio signal within a narrower window of time defined according to the approximate delay so as to more exactly converge on the delay of the echo from the locally originating audio signal for use in suppressing said echo from said return transmission audio signal.

15. The method of claim 14 further comprising the steps of:

simultaneous with at least one the steps of performing the reduced sampling rate correlation within the wider window and performing the first full sampling rate correlation within the narrower window, separately performing a second full sampling rate correlation of the locally originating audio signal to the echo in the return transmission audio signal, the second full sampling rate correlation being preset using stored parameters of a prior successful correlation.

* * * * *